United States Patent
Cottin et al.

(10) Patent No.: US 12,513,155 B2
(45) Date of Patent: Dec. 30, 2025

(54) POSTING PLATFORM VALIDATION

(71) Applicant: SAP SE, Walldorf (DE)

(72) Inventors: Pierre Cottin, Paris (FR); Martin Tournier, Paris (FR); Martin Dufour, Paris (FR)

(73) Assignee: SAP SE, Walldorf (DE)

( * ) Notice: Subject to any disclaimer, the term of this patent is extended or adjusted under 35 U.S.C. 154(b) by 141 days.

(21) Appl. No.: 18/385,773

(22) Filed: Oct. 31, 2023

(65) Prior Publication Data

US 2025/0141883 A1 May 1, 2025

(51) Int. Cl.
*H04L 9/40* (2022.01)
(52) U.S. Cl.
CPC .................. *H04L 63/123* (2013.01)
(58) Field of Classification Search
CPC .................................... H04L 63/123
USPC ................................................ 726/22
See application file for complete search history.

(56) References Cited

U.S. PATENT DOCUMENTS

| | | | |
|---|---|---|---|
| 12,294,588 B1 * | 5/2025 | Chuprevich | H04L 63/1483 |
| 2016/0057163 A1 * | 2/2016 | Boffa | H04L 63/1425 726/23 |
| 2021/0110450 A1 * | 4/2021 | Boone | G06N 20/00 |

* cited by examiner

*Primary Examiner* — Lan Dai T Truong
(74) *Attorney, Agent, or Firm* — Sterne, Kessler, Goldstein & Fox P.L.L.C.

(57) ABSTRACT

Disclosed herein are system, method, and computer program product embodiments for providing posting platform validation. An embodiment operates by receiving a first and a second URL associated with a posting platform, and a first and a second parameter associated with the first URL or the second URL. The embodiment compares a first segment of the first URL and a second segment of the second URL, and compares a third segment of the first URL and a fourth segment of the second URL. The embodiment then determines a pattern based on the comparisons. The embodiment then generates a third URL associated with the posting platform based on the pattern, the first parameter and the second parameter, issues a query to the posting platform that includes the third URL, receives a response from the posting platform; and provides an output indicating whether the third URL is being provided by the posting platform.

20 Claims, 11 Drawing Sheets

FIG. 2B

← 204 hello work

Accès recruteur ▼  Emploi ▼  Formation  ⊗ Mon compte

ABCD France
France – ABCD Partner Consultant – Finance H/F

◎ Levallois-Perret – 92    ☰ CDI ( Je postule sur le site du recruteur )

Éditeurs de logicieis – sites – apps mobiles

ABCD France recherche ...
PLEASE NOTE THIS OPPORTUNITY IS OPEN ACROSS UK, Ireland, France, Nordics, Netherland, Belgium and Luxembourg.

AND

Also please note that to BE eligible for this program Candidates must NOTE BE ABCD CERTIFIED.

FIG. 2C

| Sending frequency: | Every 4 hours |
|---|---|
| Countries/Regions: | France |
| Languages: | German (Austria), German (Swiss), German, English (Canada), English (UK), English (India), English (Philippines), English, Spanish, French (Belgium), French (Canada), French |
| Live posting update: | Available |
| Manual unpublishing: | Available |
| Text formatting: | Unavailable |
| Description: | Founded in 2007, Meteojob.com is today one of the leading job sites in France with more than 60,000 offers and more than 2.5 million registered users. With its matching technology, Meteojob allows you to target the candidates that best match your offers. | http://www.meteojob.com
General
Posting duration: 28 days ($) Paid

★ ★ ★ Optimal
ABCD recognizes that the integration with this job board has the highest level of reliability thanks its optimal technical quality and our privileged relationship with them.

FIG. 2D

| Job Status | Description |
|---|---|
| Active | The job posting is published on the job board, and the publication URL is available. |
| Credentials error | The job board sends the feedback that your credentials are no longer valid. Provide valid credentials before removing the error. |
| Credits error | The job board sends the feedback that you've consumed all your job board credits. Contact your board to subscribe to a new contract, or purchase additional job board credits. |
| Expired | The job is deleted or removed from the job board. |
| Error | The job posting was sent to the job board, but the system returned an error. For more information about the error, contact the job board. |
| Invalid Fields | The job board's system returns error messages because the job posting has one or more incorrect field values. |
| Processing | In the next publishing run, the job posting will be processed and sent to the job board. |
| Sent | The job posting is sent to the job board, and the publication URL isn't available due to the job board's technical limitations. |
| Technical error | The job board sends an unknown error message. The product and engineering team will work with the job board to resolve the issue. |

FIG. 2E

Job Board Posting – Recruiting Posting

Posted by Posting Profile Test123

| Job Board Logo | Job Board Name | | Clicks | Start Date | End Date | Days Left | Action |
|---|---|---|---|---|---|---|---|
| adem | ADEM | ⊙ Processing ⇆ | 0 | 12/13/2022 | 02/11/2023 | 60 | Remove Post |
| JOBTEASER | Jobteaser | ⊙ Processing ⇆ | 0 | 12/13/2022 | 01/12/2023 | 30 | Remove Post |
| in | Linkedin Limited Listing | ⊙ Processing ⇆ | 0 | 12/13/2022 | 01/12/2023 | 30 | Remove Post |
| MONSTER | Monster US | ⊙ Processing ⇆ | 0 | 12/13/2022 | 01/12/2023 | 30 | Remove Post |
| recruit·net | Recruit.net | ✈ Processing ⇆ | 0 | 11/15/2022 | 12/15/2022 | 2 | Remove Post |
| trovit | Trovit | ⊙ Processing ⇆ | 0 | 12/13/2022 | 02/11/2023 | 60 | Remove Post |

⟵ 210

⋮ Actions

FIG. 2F

POSTING PLATFORM VALIDATION

BACKGROUND

Software applications enable efficient execution of tasks. Such tasks may include generation, storage and analysis of data records, and communication with other applications or services based on such data records. For example, a user may operate an application to create a record, to select one or more websites, and to transmit the record to the one or more selected websites.

In one example, a recruiting application may include software modules which enable a user to create a job requisition, to select multiple third-party job posting platforms (i.e., job boards), and to transmit the job requisition to the selected job boards. The job requisition may be transmitted from the recruiting application to the job boards based on a frequency defined by each job board. However, the user may not be able to confirm a posting status of the job requisition associated with the job boards. For example, the user may not be able to confirm or validate whether the job requisition is successfully posted on each job board. In addition, the user may find it difficult to manually find the job requisition on job boards. Thus, performance and/or user experience of the recruiting application can be seriously limited.

BRIEF DESCRIPTION OF THE DRAWINGS

The accompanying drawings are incorporated herein and form a part of the specification.

FIG. 2B depicts a second example user interface of a job requisition on a first posting platform in accordance with implementations of the present disclosure.

FIG. 2C depicts a third example user interface of a job requisition on a second posting platform in accordance with implementations of the present disclosure.

FIG. 2D depicts a fourth example user interface of a recruiting application in accordance with implementations of the present disclosure.

FIG. 2E depicts a fifth example user interface of a recruiting application in accordance with implementations of the present disclosure.

FIG. 2F depicts a sixth example user interface of a recruiting application in accordance with implementations of the present disclosure.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for generating Uniform Resource Locators (URLs) associated with a posting platform that can be used to verify the posting of the job.

As described above, a recruiting application may include software modules which enable a user to create a job requisition, to select multiple third-party job posting platforms (i.e., job boards), and to transmit the job requisition to the selected job boards. However, the user may not be able to confirm a posting status of the job requisition associated with the job boards. For example, the user may not be able to confirm or validate whether the job requisition is successfully posted on each job board. In addition, the user may find it difficult to manually find the job requisition on posting platforms. Thus, performance and/or user experience of the recruiting application can be seriously limited.

Therefore, a technological solution is needed for the recruiting application to confirm or validate whether the job requisition is successfully posted on one or more posting platform. The technological solution in the present disclosure can provide posting platform validation, to validate a posting status of a job requisition on one or more posting platforms. The technological solution in the present disclosure can automatically identify, analyze and generate Uniform Resource Locators (URLs) associated with one or more posting platforms as part of the validation process.

Figure 1:
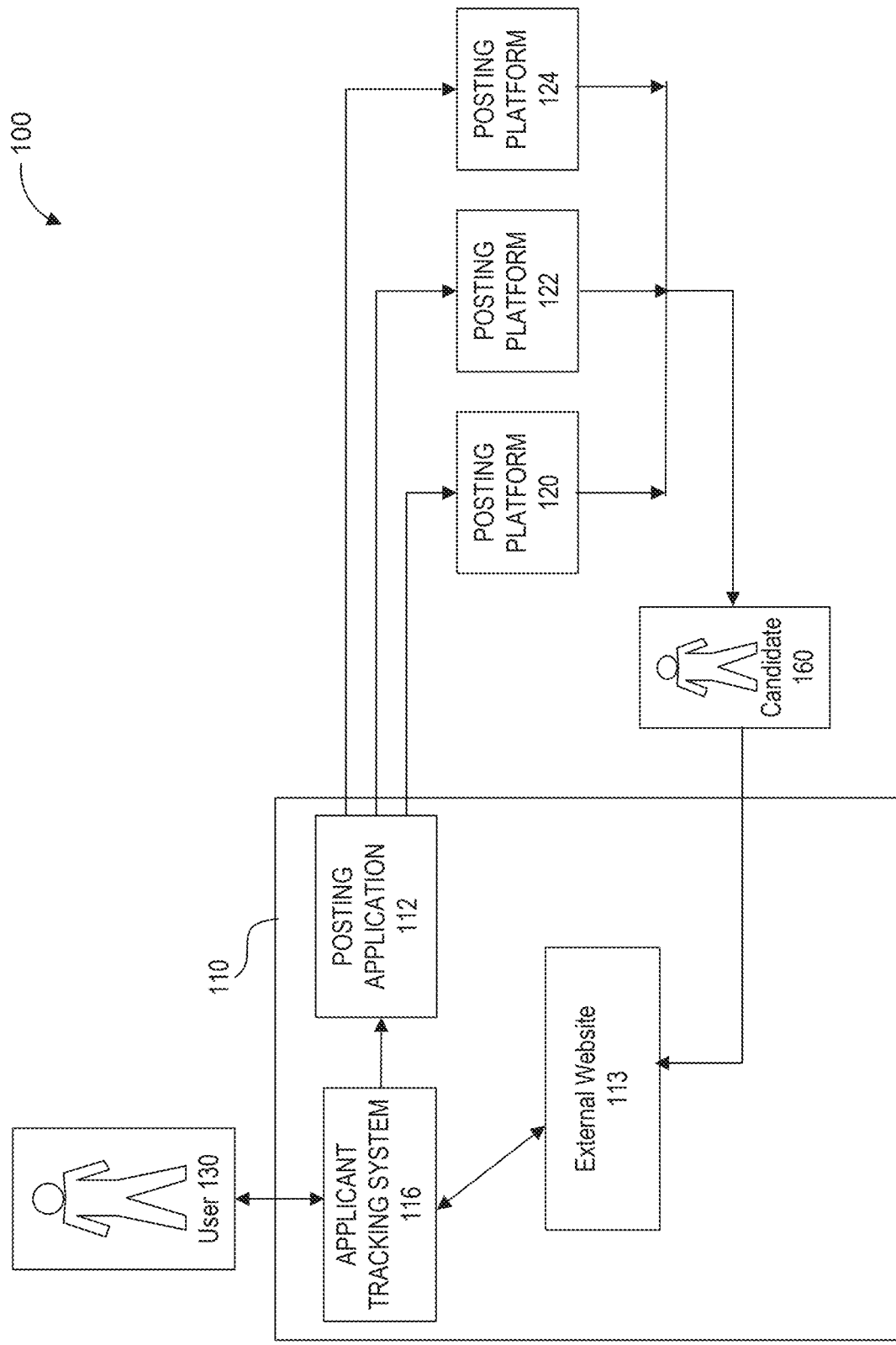
FIG. 1 illustrates an example system of a recruiting application and posting platforms integrated therewith, according to some embodiments of the disclosure.

FIG. 1 illustrates an example system of a recruiting application and posting platforms integrated therewith, according to some embodiments of the disclosure. The example system 100 is provided for the purpose of illustration only and does not limit the disclosed embodiments.

The example system 100 includes, but is not limited to, application platform 110 and posting platforms 120, 122 and 124. Application platform 110 includes one or more recruiting applications, but is not limited to, applicant tracking system 116, posting application 112 and external website 113.

In some aspects, application platform 110 may comprise an on-premise, cloud-based, or hybrid computing platform providing an execution platform and services to software applications. Each of posting platforms 120, 122 and 124 may each comprise an on-premise, cloud-based or hybrid computing system which is integrated with posting application 112.

Each of posting platforms 120, 122 and 124 may include a third-party job posting platform or a job board. One or more of posting platforms 120, 122 and 124 may be selected to match various recruitment strategies of user 130 (e.g., recruiter) of a given customer. In some embodiments, a single company or entity owns, controls or manages multiple job boards (e.g., accepting fees for allowing recruiters to place job openings on one of the job boards), and some embodiments include multiple companies or entities which own, control or manage a plurality of job boards that interact with application platform 110.

In some aspects, external website 113 may include a website (e.g., external career website of a company) posting one or more job requisitions. User 130 may generate a job requisition using application platform 110 to select external website 113 which to post the job requisition. External website 113 may communicate posted job requisitions to candidate 160 in any manner that is or becomes known. For example, candidate 160 may establish a subscription with external website 113 to receive notices (e.g., via e-mail or text) of posted job requisitions which are associated with certain characteristics (e.g., particular location, particular position, particular degree requirement). Candidate 160 may also directly access external website 113, with or without login credentials, to browse job requisitions posted thereto.

Alternatively or in addition, user 130 may generate a job requisition using application platform 110 to select one or more of posting platforms 120, 122 and 124 on which to post the job requisition. Each of the selected posting platforms 120, 122 and 124 may communicate posted job requisitions to candidate 160 in any manner that is or becomes known. For example, candidate 160 may establish a subscription with one or more posting platforms 120, 122 and 124 to receive notices (e.g., via e-mail or text) of posted job requisitions which are associated with certain characteristics (e.g., particular location, particular position, particular degree requirement). Candidate 160 may also directly access posting platforms 120, 122 and 124, with or without login credentials, to browse job requisitions posted thereto.

According to some aspects, candidate 160 may respond to a job requisition via posting platform 120 to which the job requisition is posted. For example, posting platform 120 may include an indication (e.g., hyperlink) which candidate 160 be directed to external website 113. Candidate 160 may upload documents, such as a resume and cover letter, to external website 113. Documents of candidate 160 may be transmitted to applicant tracking system 116. User 130 may interact with applicant tracking system 116 to facilitate the review of communications received from candidates.

Applicant tracking system 116, and posting application 112 may comprise elements of a suite of applications provided by application platform 110. User 130 may access a home Web page of application platform 110, provide suitable credentials, and be presented with an interface allowing selection of one of the applications. Each application may communicate with other applications of the suite via respective Application Programming Interfaces (APIs).

Figure 2A:
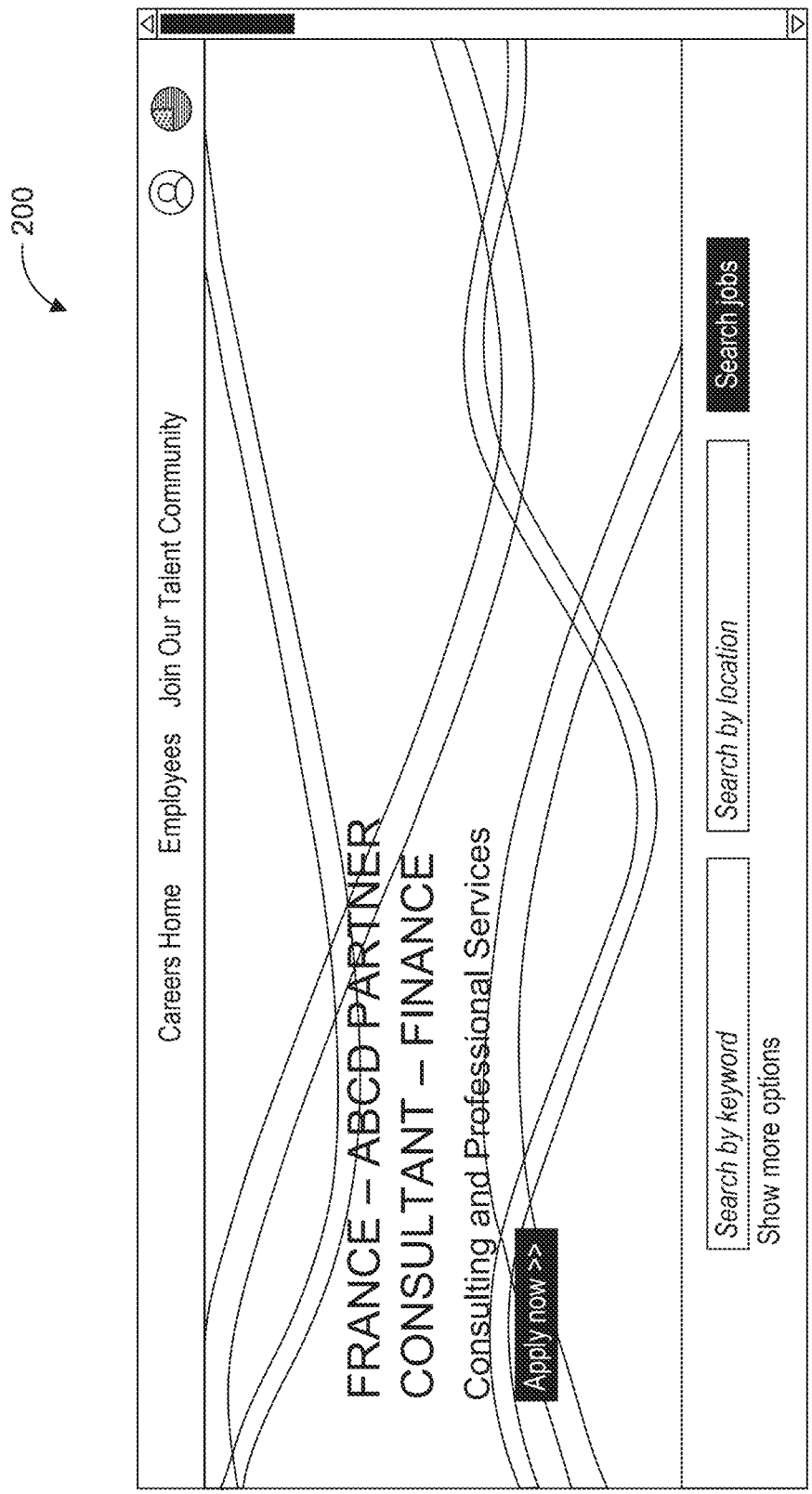
FIG. 2A depicts a first example user interface for a job requisition on an external website in accordance with implementations of the present disclosure.

FIG. 2A depicts a first example user interface for a job requisition on an external website in accordance with implementations of the present disclosure. A website (e.g., external website 113) may output user interface 200. For example, user interface 200 may be in association with an application platform (e.g., application platform 110 of FIG. 1, as described above). User interface 200 may be provided in response to a job requisition generated using application platform 110. However, user interface 200 is not limited thereto.

As described above, user 130 may generate a job requisition using application platform 110 to select external website 113 which to post the job requisition. Candidate 160 may directly access external website 113, with or without login credentials, to browse job requisitions posted on user interface 200. Candidate 160 may upload documents, such as a resume and cover letter, to external website 113. As shown in user interface 200, a job requisition of "CONSULTANT—FINANCE" is posted by user 130 of "ABCD" company.

User interface 200 may also be displayed as different shapes, colors, and sizes. Additionally, user interface 200 may have less user interface elements or more user interface elements than depicted in FIG. 2A. In embodiments, despite having different shapes, colors, sizes, etc., user interface 200 has the same or substantially the same functionality. That is, user interface 200 may enable candidate 160 to interact with external website 113 as discussed herein.

Figure 2B:
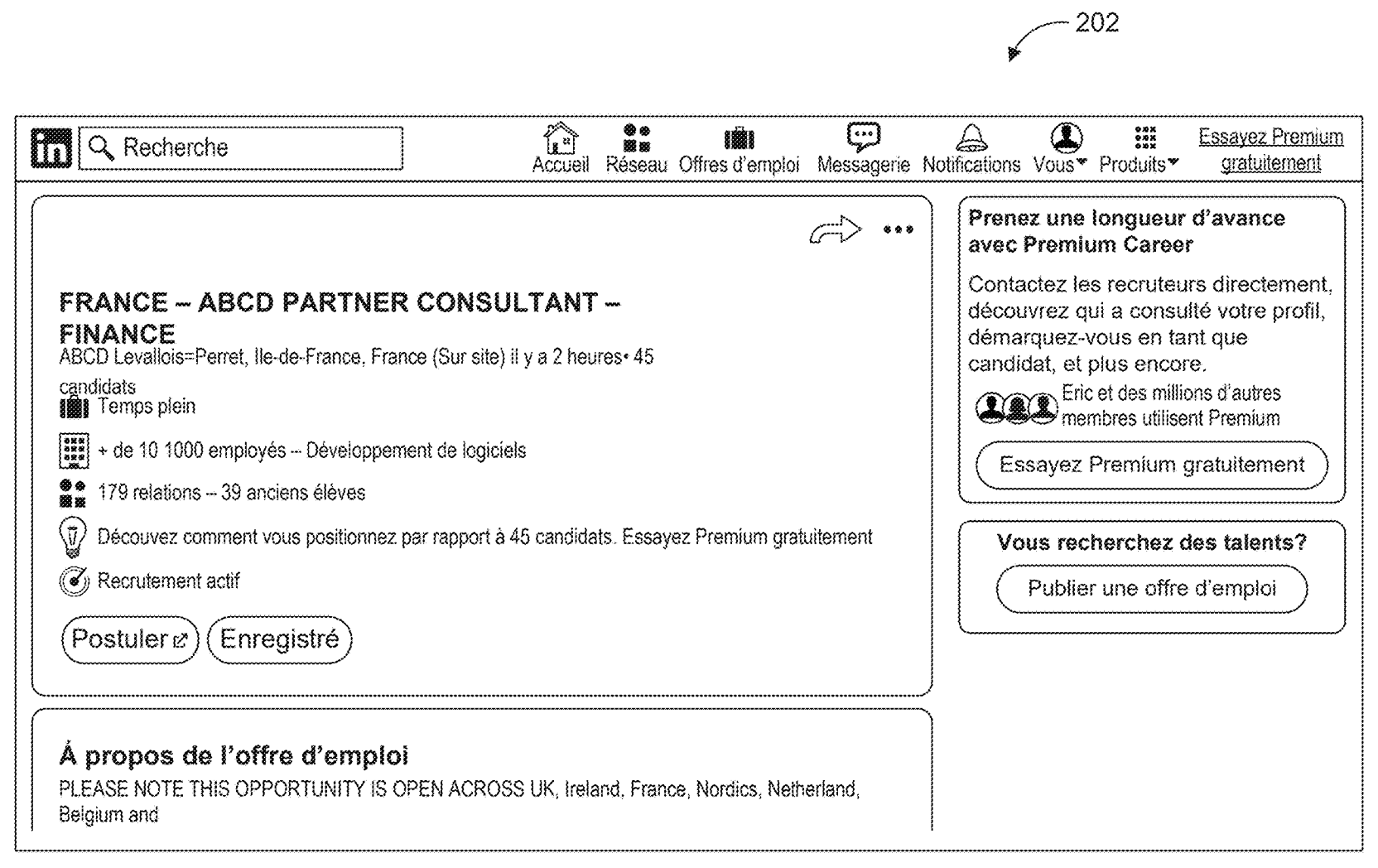

FIG. 2B depicts a second example user interface of a job requisition on a first posting platform in accordance with implementations of the present disclosure. For example, user interface 202 may be in association with a posting platform (e.g., one of posting platforms 120, 122 and 124 of FIG. 1, as described above). User interface 202 may be provided in response to a job requisition generated using application platform 110. However, user interface 202 is not limited thereto.

As described above, user 130 may generate a job requisition using application platform 110 to select posting platform 120 (e.g., LinkedIn) on which to post the job requisition. Candidate 160 may access posting platform 120, with or without login credentials, to browse job requisitions posted on user interface 202. As shown in user interface 202, a job requisition of "CONSULTANT—FINANCE" is posted by user 130 of "ABCD" company. User interface 202 may include an indication (e.g., hyperlink) which candidate 160 may use to be directed to external website 113. Candidate 160 may upload documents, such as a resume and cover letter, to external website 113.

User interface 202 may also be displayed as different shapes, colors, and sizes. Additionally, user interface 202 may have less user interface elements or more user interface elements than depicted in FIG. 2B. In embodiments, despite having different shapes, colors, sizes, etc., user interface 202 has the same or substantially the same functionality. That is, user interface 202 may enable candidate 160 to interact with posting platform 120 as discussed herein.

FIG. 2C depicts a third example user interface of a job requisition on a second posting platform in accordance with implementations of the present disclosure. For example, user interface 204 may be in association with a posting platform (e.g., one of posting platforms 120, 122 and 124 of FIG. 1, as described above). User interface 204 may be provided in response to a job requisition generated using application platform 110. However, user interface 204 is not limited thereto.

As described above, user 130 may generate a job requisition using application platform 110 to select posting platform 122 on which to post the job requisition. Candidate 160 may access posting platform 122, with or without login credentials, to browse job requisitions posted on user interface 204. As shown in user interface 204, a job requisition of "CONSULTANT—FINANCE" is posted by user 130 of "ABCD" company. User interface 204 may include an indication (e.g., hyperlink) which candidate 160 be directed to external website 113. Candidate 160 may upload documents, such as a resume and cover letter, to external website 113.

User interface 204 may also be displayed as different shapes, colors, and sizes. Additionally, user interface 204 may have less user interface elements or more user interface elements than depicted in FIG. 2C. In embodiments, despite having different shapes, colors, sizes, etc., user interface 204 has the same or substantially the same functionality. That is, user interface 204 may enable candidate 160 to interact with posting platform 122 as discussed herein.

FIG. 2D depicts a fourth example user interface of a recruiting application in accordance with implementations of the present disclosure. For example, user interface 206 may be in association with a recruiting application (e.g., application platform 110 of FIG. 1, as described above). However, user interface 206 is not limited thereto.

As described above, user 130 may generate a job requisition using application platform 110 to select one or more of posting platforms 120, 122 and 124 on which to post the job requisition. Each of posting platforms 120, 122 and 124 may each comprise an on-premise, cloud-based or hybrid computing system which is integrated with posting application 112, such as by XML feed, and/or API connection.

In some aspects, job requisitions may be transmitted from application platform 110 to one or more of posting platforms 120, 122 and 124 based on a sending frequency defined and validated with each of posting platforms 120, 122 and 124, such as once a day, or each hour. As shown in FIG. 2D, information associated with the transmission of job requisitions, such as sending frequency and posting platforms, is displayed in user interface 206 associated with application platform 110.

However, as described above, the user may not be able to confirm a posting status of the job requisition associated with the posting platforms. For example, the user may not be able to confirm or validate whether the job requisition is successfully posted on each job board. In addition, the user may find it difficult to manually find the job requisition on posting platforms.

User interface 206 may also be displayed as different shapes, colors, and sizes. Additionally, user interface 206 may have less user interface elements or more user interface elements than depicted in FIG. 2D. In embodiments, despite having different shapes, colors, sizes, etc., user interface 206 has the same or substantially the functionality. That is, user interface 206 may enable user 130 to interact with application platform 110 as discussed herein.

FIG. 2E depicts a fifth example user interface of a recruiting application in accordance with implementations of the present disclosure. FIG. 2F depicts a sixth example user interface of a recruiting application in accordance with implementations of the present disclosure. For example, user interface 208 and 210 may be in association with a recruiting application (e.g., application platform 110 of FIG. 1, as described above). However, user interface 208 and 210 are not limited thereto.

In some aspects, subsequent to the transmission of the job requisitions from application platform 110 to one or more of posting platforms 120, 122 and 124, one or more posting status of the job requisitions may be displayed in FIGS. 2E-2F associated with application platform 110.

As shown in FIG. 2E, user interface 208 may be provided to user 130 regarding the definition and description of a job posting status. As shown in FIG. 2F, user interface 210 may be provided to user 130 regarding the job posting status on one or more of posting platforms 120, 122 and 124.

User interfaces 208 and 210 may also be displayed as different shapes, colors, and sizes. Additionally, user interfaces 208 and 210 may have less user interface elements or more user interface elements than depicted in FIGS. 2E and 2F. In embodiments, despite having different shapes, colors, sizes, etc., interfaces 208 and 210 have the same or substantially the functionality. That is, user interfaces 208 and 210 may enable user 130 to interact with application platform 110 as discussed herein.

Figure 3:
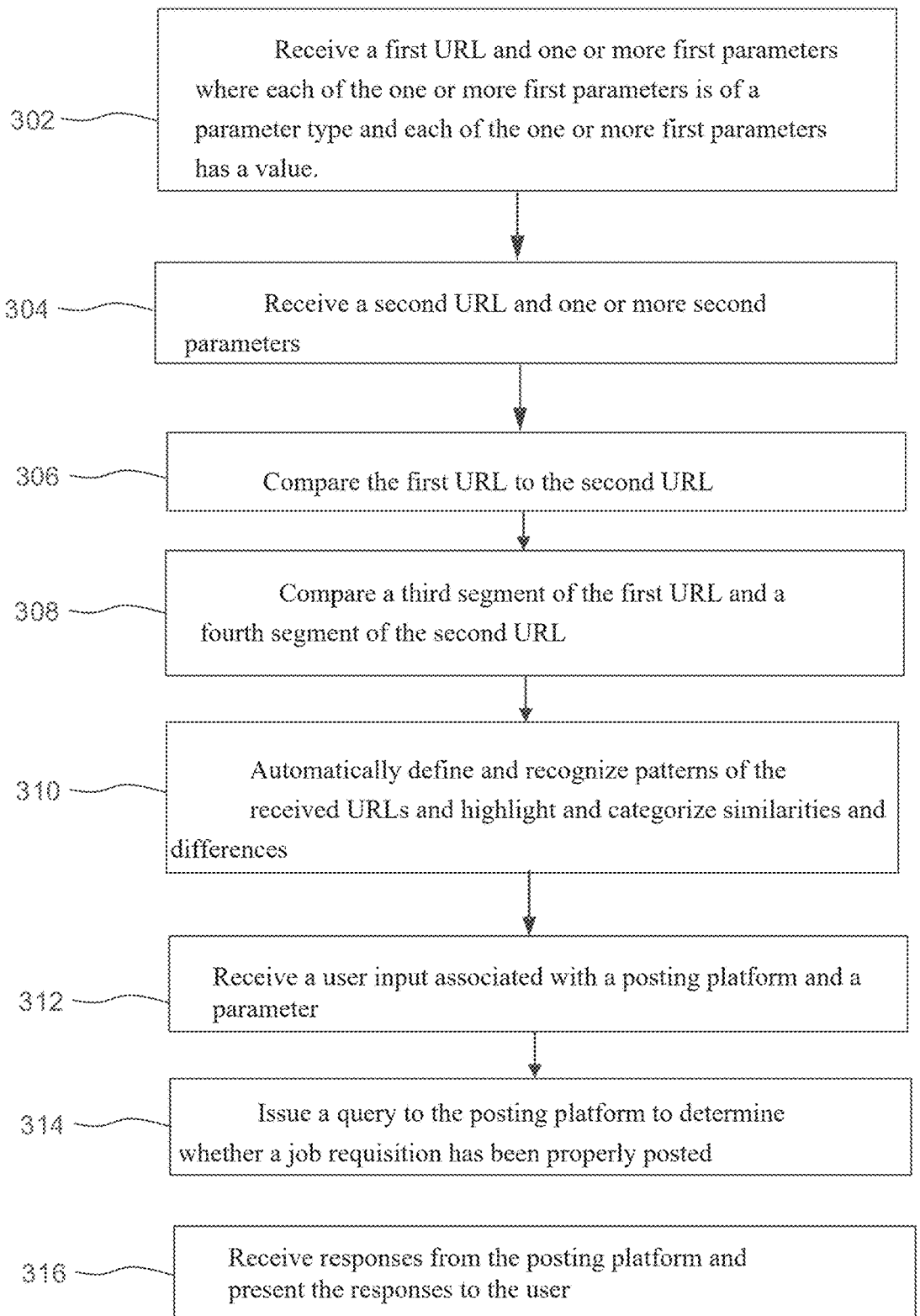
FIG. 3 illustrates a flowchart for a process for providing posting platform validation, according to some embodiments.

FIG. 3 illustrates a flowchart for a method 300 for providing posting platform validation, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIGS. 1, 2A-AF and 4A-4B. However, method 300 is not limited to that example embodiment.

In 302, application platform 110 receives a first URL and one or more first parameters where each of the one or more first parameters is of a parameter type and each of the one or more first parameters has a value. The first URL is associated with a posting platform (e.g., posting platform 120). In some aspects, the first URL is associated with a first job requisition posted on posting platform 120. The first parameter's type is associated with an attribute of the first job requisition, such as a unique identifier, a posting date, or a job title.

In 304, application platform 110 receives a second URL and one or more second parameters. The second URL is associated with posting platform 120. In some aspects, the second URL is associated with a second job requisition posted on posting platform 120. The second parameter is associated with an attribute of the second job requisition, such as a unique identifier, a posting date or a job title. While the first parameter and the second parameter share the same parameter type, the value of the first parameter can be different from the value of the second parameter. For example, the posting date and/or job title between the first job requisition and the second job requisition can be different values, but are of the same type.

In 306, application platform 110 compares the first URL to the second URL. As part of this comparison, the application platform 110 determines that a first segment of the first URL is substantially similar to a second segment of the second URL. If it is determined that the first segment of the first URL is similar to the second segment of the second URL, the process continues to 308, otherwise it ends.

In 308, application platform 110 compares a third segment of the first URL and a fourth segment of the second URL. Application platform 110 determines if the third segment and the fourth segment are different. If it is determined that the third segment and the fourth segment are the same, the process ends. However, if the third segment and the fourth segment are different, the process continues at 310. Attributes of the third segment of the first URL and the fourth segment of the second URL can be associated with a parameter type.

In 310, application platform 110 automatically defines and recognizes patterns of the received URLs and highlight and categorize similarities and differences.

For example, the first job requisition can be posted on Dec. 10, 2022 with a first URL link of "https://www.meteojob.com/jobs#job-offer-26798026". The second job requisition can be posted on Dec. 8, 2022, with a second URL link of "https://www.meteojob.com/jobs#job-offer-26737906".

Application platform 110 can identify similarities and differences between the first URL and the second URL. The first segment and the second segment of "https://www.meteojob.com/jobs#job-offer" can be determined as a similarity between the first URL and the second URL. A third segment of "26798026" and a fourth segment of "26737906" can be determined as differences between the first URL and the second URL. In some implementations, the difference between the third segment and the fourth segment is the mathematical difference. In this example, the difference is 26798026−26737906=60,120. Once this difference is determined, a calculation can be done to determine the approximate number of postings this particular job board posts per day. Since there are 2 days difference between these two postings, it can be assumed that this job board posts approximately 30,060 posts per day.

It should be noted that alternative implementations may compare more than two URLs for similarities and differences.

In some aspects, application platform 110 can analyze the first segment and the second segment to determine these URLs are associated with the same posting platform and then analyze the third segment, the fourth segment, and the parameter to identify that the related job posting reference is increasing day after day i.e. each new job posting has a higher job posting reference.

In 312, application platform 110 receives a user input associated with a posting platform and a parameter. In some aspects, the user is conducting a search to determine if a job requisition has been posted on a particular job board. In such cases, the parameter from the user may include a job title, (e.g., cleaning agent) and a date in which any previous job requisition was successfully placed on a particular job board. This provides a recency context to the query without necessarily limiting the query to a specific date which can be problematic if the date of posting the job requisition is not known. Application platform 110 can generate a third URL associated with the posting platform based at least on the patterns recognized in 310, the first parameter and the second parameter, to validate whether a previous job requisition was successfully placed on a particular job board. The third URL can include the first segment or the second segment. In some examples, application platform 110 can generate the third URL as described with reference to FIG. 4.

In 314, application platform 110 issues a query to the posting platform to determine whether a job requisition has been properly posted. Continuing with the example above, having determined that a particular job board posts approximately 30,060 jobs per day, and knowing the date a particular job requisition was supposed to be posed (e.g., December 15), the application platform 110 may issue a more targeted query to locate the desired job requisition using a set of queries estimated to locate the desired job requisition by finding a match with job title and a particular unique segment within the desired range when the job was supposed to be posted. The query to the posting platform can include the third URL.

In 316, application platform 110 receives responses from the posting platform and presents the responses to the user. Application platform 110 can provide an output indicating whether the third URL is being provided by the posting platform.

Figure 4A:
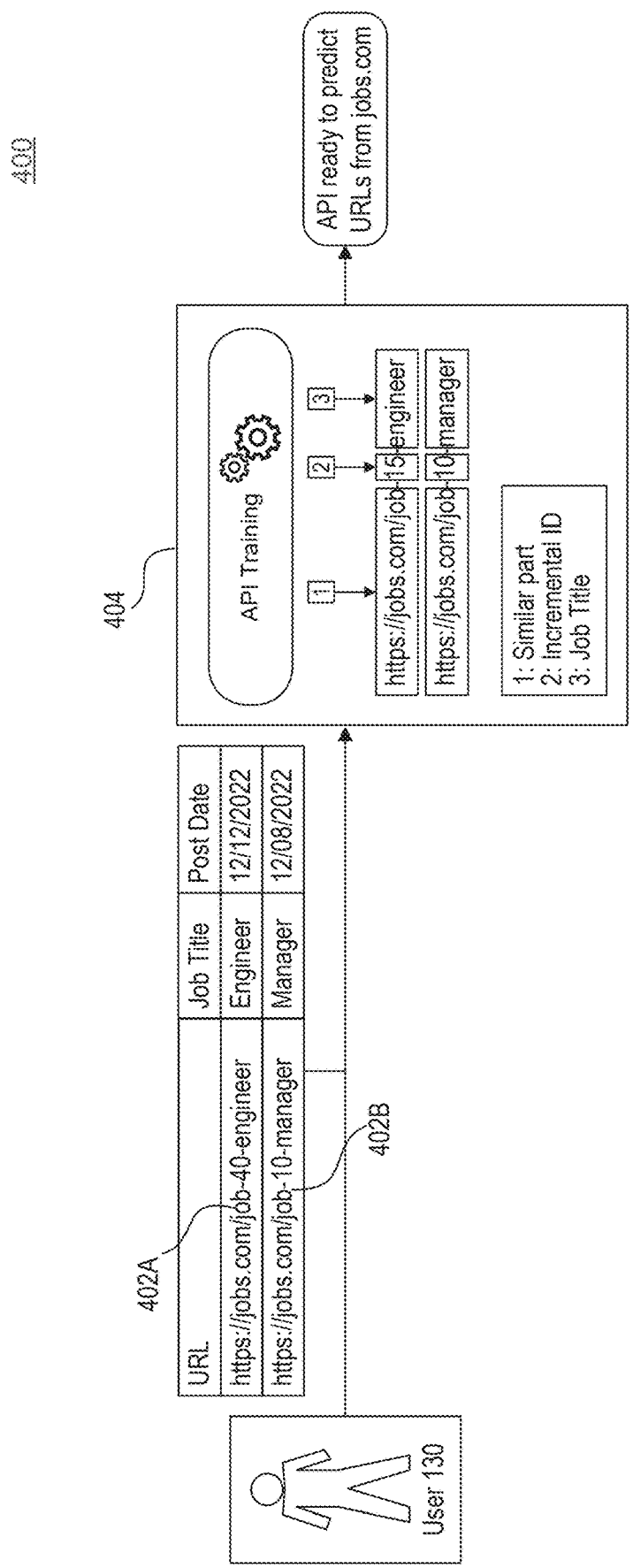
FIG. 4A illustrates an example block diagram of a machine learning URL prediction model system, according to some embodiments.
Figure 4B:
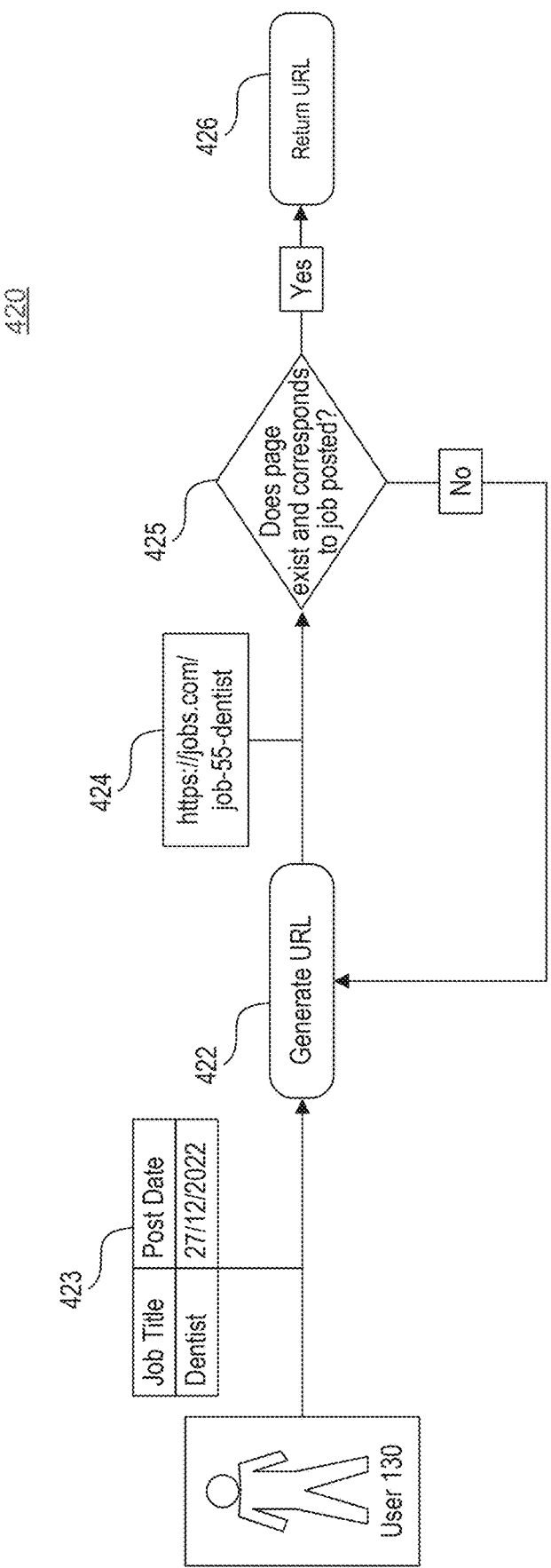
FIG. 4B illustrates an example method for providing posting platform validation, according to some embodiments.

In various embodiments, the technology described in FIG. 3 may implement a machine learning mechanism (FIGS. 4A-4B).

Machine learning may involve computers learning from data provided so that they carry out certain tasks. For more advanced tasks, it can be challenging for a human to manually create the needed algorithms. This may be especially true of teaching approaches to correctly. The discipline of machine learning therefore employs various approaches to teach computers to accomplish tasks where no fully satisfactory algorithm is available. In cases where vast numbers of potential answers exist, one approach, supervised learning, is to label some of the correct answers as valid. This may then be used as training data for the computer to improve the algorithm(s) it uses to determine correct answers. For example, to train a system for the task of generating a URL, a dataset of URLs may be used.

FIG. 4A illustrates an example block diagram of a machine learning URL prediction model system 400, according to some embodiments. Machine learning URL prediction model system 400 may be implemented by processing logic that can comprise hardware (e.g., circuitry, dedicated logic, programmable logic, microcode, etc.), software (e.g., iGenenstructions executing on a processing device), or a combination thereof. It is to be appreciated that not all steps may be needed to perform the disclosure provided herein. Further, some of the steps may be performed simultaneously, or in a different order than described for FIG. 4A, as will be understood by a person of ordinary skill in the art.

Machine learning involves computers discovering how they can perform tasks without being explicitly programmed to do so. Machine learning (ML) includes, but is not limited to, artificial intelligence, deep learning, fuzzy learning, supervised learning, unsupervised learning, etc. Machine learning algorithms build a model based on sample data, known as "training data", in order to make predictions or decisions without being explicitly programmed to do so. For supervised learning, the computer is presented with example inputs and their desired outputs and the goal is to learn a general rule that maps inputs to outputs. In another example, for unsupervised learning, no labels are given to the learning algorithm, leaving it on its own to find structure in its input. Unsupervised learning can be a goal in itself (discovering hidden patterns in data) or a means towards an end (feature learning). In the various aspects described hereafter, the ML models may be trained offline in supervised fashion using data download logs. These models may be fed a number of input parameters. In some embodiments, the ML models may be deployed in the cloud, or on a client device.

In some aspects, machine learning URL prediction model system 400 may be configured with a machine learning URL predictive model 404, hereafter URL predictive model. The URL predictive model 404 may be associated with training one or more APIs of application platform 110. The URL predictive model 404 is generated by machine learning algorithms based on sample data, known as "training data", in order to make predictions or decisions without being explicitly programmed to do so.

As shown in FIG. 4A, the sample data may include data 402A and data 402B. In some aspects, data 402A includes a first URL of "https://jobs.com/job-40-engineer", a job title of "Engineer" and a first posting date of Dec. 12, 2022. In some aspects, data 402B includes a second URL of "https://jobs.com/job-10-manager", a job title of "Manager" and a second posting date of Aug. 12, 2022. The URL predictive model 404 may receive data 402A and data 402B from one of the posting platforms 120, 122 and 124, such as a history of URL of posting platform 120. The URL predictive model 404 can analyze the first URL and second URL to identify a similar part between the first URL and second URL. As shown in FIG. 4A, the similar part between the first URL and second URL is "https://jobs.com/job". The URL predictive model 404 can identify the similar part in the first URL and the second URL using a regular expression (REGEXP) technique. REGEXP includes a sequence of characters that specifies a match pattern in text. Usually such patterns are used by string-searching algorithms for "find" or "find and replace" operations on strings, or for input validation.

In some aspects, the URL predictive model 404 can identify parts that are different in the first URL and the second URL, such as an Incremental ID, and a job title. The incremental ID can include a first incremental ID of 40 for the first URL. The incremental ID can include a second incremental ID of 10 for the second URL. The incremental ID can include for example, a unique ID of a job requisition associated with the first URL or second URL. In addition, or alternatively, the incremental ID can be an indicator of the post date of the job requisition associated with the first URL or second URL. The first URL includes a segment of "engineer" and the second URL includes a segment of "manager".

In some aspects, the URL predictive model 404 can identify one or more relationships or patterns between parts that are different in the first URL and the second URL. For example, the segment of "engineer" of the first URL can be associated with the job title in data 402A. The segment of "manager" of the second URL can be associated with the job title in data 402B.

In some aspects, the URL predictive model 404 can estimate a number of job requisitions on posting platform 120 each day, for example based on the first incremental ID, the second incremental ID, and a number of days between the first posting date and the second posting date. The number of job requisitions on posting platform 120 each day (Nj) may be estimated by the following formula:

$$Nj = (\text{First incremental } ID - \text{Second incremental } ID)/\text{Number of days between the first posting and the second posting}$$

As an example, from FIG. 4A, the estimated job requisitions posted per day will be (40−10)/4 which equals approximately 7.5 postings per day.

In some aspects, the URL predictive model 404 can identify one or more relationships or patterns between parts that are different in the first URL and the second URL, based on other machine learning mechanisms, and is not limited thereto. In some aspects, the URL predictive model 404 can include one or more language models to perform natural language processing (NLP) tasks like translating languages, classifying texts, and answering questions. The one or more language models can include a probabilistic language model or a neural network based language model. For example, a language model, such as GPT, can be used to generate a set of target words or labels using an off-the-shelf text generator.

FIG. 4B illustrates an example method for providing posting platform validation, according to some embodiments. As a convenience and not a limitation, FIG. 4B may be described with regard to elements of FIGS. 1, 2A-AF, 3 and 4A. Method 420 may represent the operation of a computing system (e.g., application platform 110) for providing posting platform validation. But method 420 is not limited to the specific aspects depicted in those figures and other systems may be used to perform the method as will be understood by those skilled in the art. It is to be appreciated that not all operations may be needed, and the operations may not be performed in the same order as shown in FIG. 4B.

In step 422, application platform 110 generates a URL of posting platform 120 based at least on user input 423 and the URL predictive model 404, to verify a job posting associated with user input 423 on posting platform 120. User input 423 from user 130 may include one or more parameters such as a job title "Dentist" with a date of Dec. 27, 2022 where it is expected that a job requisition with similar attributes was post on posting platform 120 (e.g., https://jobs.com/). User input 423 may be fed to the URL predictive model 404 to generate URL 424 that is of similar attributes as provided for on posting platform 120.

In some aspects, the URL predictive model 404 can generate URL 424 based on the similar part of URLs associated with posting platform 120, and a predicted segment.

As described above in FIG. 4A, the URL predictive model 404 can analyze the first URL and second URL to identify a similar part between the first URL and second URL associated with posting platform 120. In one example, the similar part between the first URL and second URL can be something like https://jobs.com/job, that forms one segment of the predicted or generated URL The URL predictive model 404 can further generate the predicted segment based on the one or more relationships or patterns between parts that are different in the first URL and the second URL associated with posting platform 120, as described with reference to FIG. 4A. For example, the predicted segment can include a portion associated with an estimated incremental ID and another portion associated with a parameter provided in user input 423 such as job title. The estimated incremental ID can be determined based on the following formula:

$$ID_{estimated} = ID_{\text{most-recent}} + \text{Number of days} \times AveragePostingRate$$

ID most-recent may include an incremental ID associated with a most recent job requisition posted on posting platform that can be used by the URL predictive model 404. For example, as described above in FIG. 4A, ID most-recent may include a first incremental ID of 40. Days may include a number of days between the posting date in user input 423 and the posting date associated with the first incremental ID, which is 15 days in this example. The AveragePostingRate can be estimated by the number of job requisitions on posting platform 120 each day (Nj) as described with reference to FIG. 4A. In some aspects, the URL predictive model 404 may generate different estimated incremental ID than the estimated incremental ID determined based on the formula, such as to add variations inclusive of business days only, exclusions of holidays, etc. to the estimated incremental ID to provide different estimates.

In some aspects, the URL predictive model 404 may generate URL 424 by attaching the predicted segment subsequent to the similar part between the URLs associated with posting platform 120. URL 424 can include "https://jobs.com/job-55-dentist" as shown in FIG. 4B.

In 425, using the generated URL 424, application platform 110 determines whether the web page of URL 424 exists on posting platform 120 and such URL corresponds to the parameters associated with a job requisition input by user at input 423. When it is determined that the web page of URL 424 exists and correspond to the parameters of user input 423, the method 420 goes to 426. In 426, application platform 110 may send URL 424 or the web page of URL 424 as shown on posting platform 120 to user 130, such as via a user interface, to confirm the validation of the job requisition on posting platform 120.

If it is determined at 425 that a web page associated with URL 424 either does not exist or does not correspond to the in user input 423 (e.g., the posted job requisition is for a Lawyer and not a Dentist), the method 420 goes to 422 where the segment of the URL generated from the differences analysis of the previous URLs is modified. As examples, the estimated ID of 55 may be decremented by 1 to 54 or incremented by 1 to 56.

Figure 5:
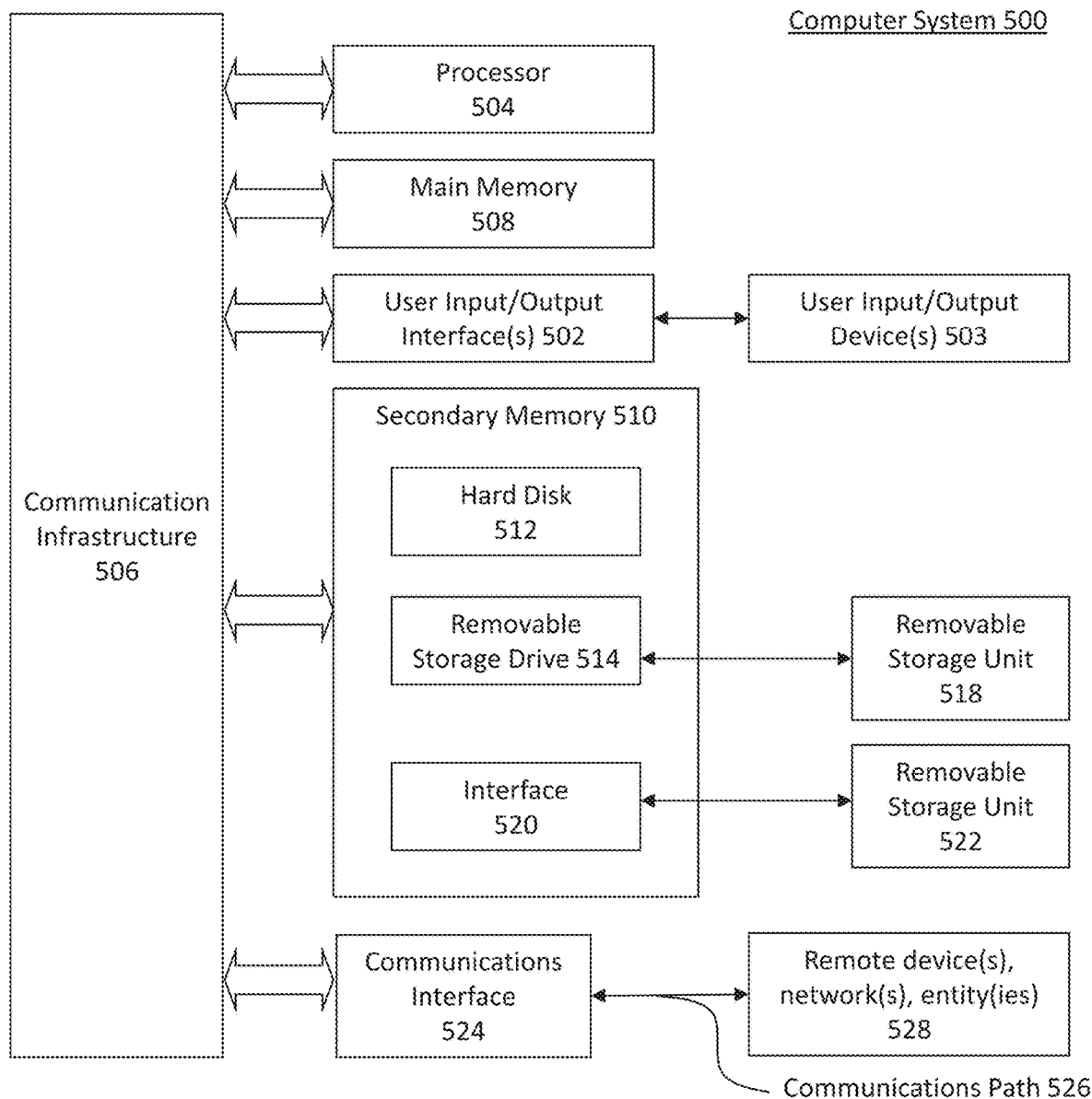
FIG. 5 illustrates an example computer system that can be used for implementing various embodiments.

Various embodiments may be implemented, for example, using one or more well-known computer systems, such as computer system 500 shown in FIG. 5. For example, database system 201 may be implemented using combinations or sub-combinations of computer system 500. Also or alternatively, client device 102, server system 104 may be implemented using combinations or sub-combinations of computer system 500. Also or alternatively, one or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500 or processor(s) 504), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for providing posting platform validation, the computer-implemented method comprising:
    receiving, by a computing system, a first URL, wherein the first URL is associated with a posting platform;
    receiving a second URL, wherein the second URL is associated with the posting platform;
    receiving a first parameter associated with a first attribute of the first URL or the second URL;
    receiving a second parameter associated with a second attribute of the first URL or the second URL;
    determining a first segment of the first URL and a second segment of the second URL are substantially the same based on comparing the first URL to the second URL;
    in response to determining that the first segment of the first URL and the second segment of the second URL are substantially the same, determining a third segment of the first URL and a fourth segment of the second URL are different by comparing the first URL to the second URL;
    determining a pattern based on the determination that the third segment of the first URL and the fourth segment of the second URL are different;
    generating a third URL associated with the posting platform based at least on the pattern, the first parameter and the second parameter, wherein the third URL comprises the first segment of the first URL or the second segment of the first URL;
    issuing a query to the posting platform that includes the third URL;
    receiving a response from the posting platform; and
    providing an output indicating whether the third URL is being provided by the posting platform.

2. The computer-implemented method of claim 1, wherein the first parameter comprises a unique identifier of the first attribute.

3. The computer-implemented method of claim 1, wherein the second parameter comprises a date.

4. The computer-implemented method of claim 1, wherein the first attribute and the second attribute are substantially the same, and wherein the determining the pattern comprises:
    determining a first difference between the third segment of the first URL and the fourth segment of the second URL;
    determining a second difference between a first value of the first parameter and a second value of the second parameter; and
    determining the pattern based at least on the first difference and the second difference.

5. The computer-implemented method of claim 1, wherein the determining the pattern comprises:
    determining a first difference between a first value of the first parameter and a second value of the first parameter;
    determining a second difference between a third value of the second parameter and a fourth value of the second parameter; and
    determining the pattern based at least on the first difference and the second difference.

6. The computer-implemented method of claim 1, wherein the generating the third URL associated with the posting platform based at least on the pattern, the first parameter and the second parameter comprises:
    receiving a fifth value of the first parameter and a sixth value of the second parameter; and
    generating the third URL based at least on the pattern, the fifth value, and the sixth value.

7. The computer-implemented method of claim 1, wherein the generating the third URL associated with the posting platform is based on a machine learning mechanism.

8. A computing system for providing posting platform validation, comprising:
    one or more memories; and
    at least one processor each coupled to at least one of the memories and configured to perform operations comprising:
        receiving a first URL, wherein the first URL is associated with a posting platform;
        receiving a second URL, wherein the second URL is associated with the posting platform;
        receiving a first parameter associated with a first attribute of the first URL or the second URL;

receiving a second parameter associated with a second attribute of the first URL or the second URL;

determining a first segment of the first URL and a second segment of the second URL are substantially the same based on comparing the first URL to the second URL;

in response to determining that the first segment of the first URL and the second segment of the second URL are substantially the same, determining a third segment of the first URL and a fourth segment of the second URL are different by comparing the first URL to the second URL;

determining a pattern based on the determination that the third segment of the first URL and the fourth segment of the second URL are different;

generating a third URL associated with the posting platform based at least on the pattern, the first parameter and the second parameter, wherein the third URL comprises the first segment of the first URL or the second segment of the first URL;

issuing a query to the posting platform that includes the third URL;

receiving a response from the posting platform; and providing an output indicating whether the third URL is being provided by the posting platform.

9. The computing system of claim 8, wherein the first parameter comprises a unique identifier of the first attribute.

10. The computing system of claim 8, wherein the second parameter comprises a date.

11. The computing system of claim 8, wherein the first attribute and the second attribute are substantially the same, and wherein the operation of the determining the pattern comprises:

determining a first difference between the third segment of the first URL and the fourth segment of the second URL;

determining a second difference between a first value of the first parameter and a second value of the second parameter; and determining the pattern based at least on the first difference and the second difference.

12. The computing system of claim 8, wherein the operation of the determining the pattern comprises:

determining a first difference between a first value of the first parameter and a second value of the first parameter;

determining a second difference between a third value of the second parameter and a fourth value of the second parameter; and determining the pattern based at least on the first difference and the second difference.

13. The computing system of claim 8, wherein the operation of the generating the third URL associated with the posting platform based at least on the pattern, the first parameter and the second parameter comprises:

receiving a fifth value of the first parameter and a sixth value of the second parameter; and generating the third URL based at least on the pattern, the fifth value, and the sixth value.

14. The computing system of claim 8, wherein the operation of the generating the third URL associated with the posting platform is based on a machine learning mechanism.

15. A non-transitory computer-readable medium having instructions stored thereon that, when executed by at least one computing device, cause the at least one computing device to perform operations comprising:

receiving a first URL, wherein the first URL is associated with a posting platform;

receiving a second URL, wherein the second URL is associated with the posting platform;

receiving a first parameter associated with a first attribute of the first URL or the second URL;

receiving a second parameter associated with a second attribute of the first URL or the second URL;

determining a first segment of the first URL and a second segment of the second URL are substantially the same based on comparing the first URL to the second URL;

in response to determining that the first segment of the first URL and the second segment of the second URL are substantially the same, determining a third segment of the first URL and a fourth segment of the second URL are different by comparing the first URL to the second URL;

determining a pattern based on the determination that the third segment of the first URL and the fourth segment of the second URL are different;

generating a third URL associated with the posting platform based at least on the pattern, the first parameter and the second parameter, wherein the third URL comprises the first segment of the first URL or the second segment of the first URL;

issuing a query to the posting platform that includes the third URL;

receiving a response from the posting platform; and providing an output indicating whether the third URL is being provided by the posting platform.

16. The non-transitory computer-readable medium of claim 15, wherein the first parameter comprises a unique identifier of the first attribute.

17. The non-transitory computer-readable medium of claim 15, wherein the second parameter comprises a date.

18. The non-transitory computer-readable medium of claim 15, wherein the first attribute and the second attribute are substantially the same, and wherein the operation of the determining the pattern comprises:

determining a first difference between the third segment of the first URL and the fourth segment of the second URL;

determining a second difference between a first value of the first parameter and a second value of the second parameter; and determining the pattern based at least on the first difference and the second difference.

19. The non-transitory computer-readable medium of claim 15, wherein the operation of the determining the pattern comprises:

determining a first difference between a first value of the first parameter and a second value of the first parameter;

determining a second difference between a third value of the second parameter and a fourth value of the second parameter; and determining the pattern based at least on the first difference and the second difference.

20. The non-transitory computer-readable medium of claim 15, wherein the operation of the generating the third URL associated with the posting platform based at least on the pattern, the first parameter and the second parameter comprises:

receiving a fifth value of the first parameter and a sixth value of the second parameter; and generating the third URL based at least on the pattern, the fifth value, and the sixth value.

* * * * *